M. E. WOOD.
MOTORCYCLE SEAT.
APPLICATION FILED AUG. 23, 1919.
1,353,108. Patented Sept. 14, 1920.
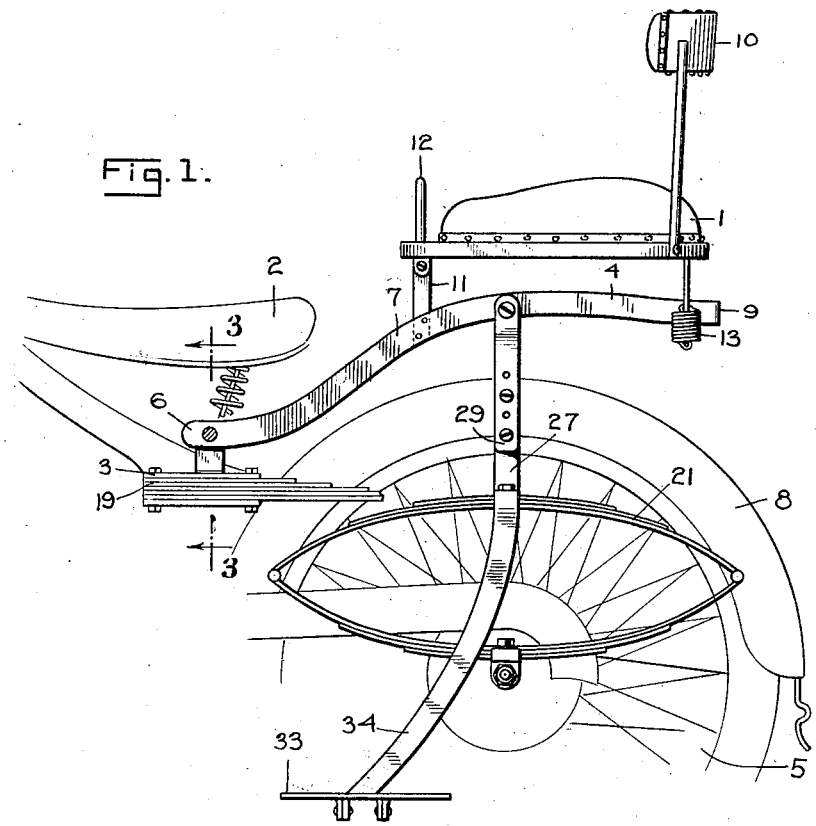
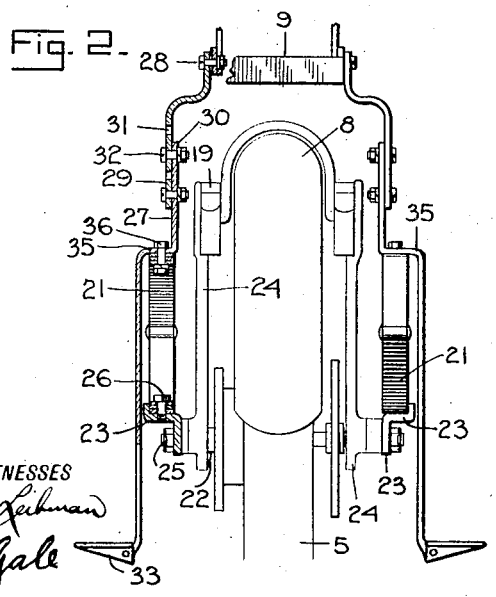
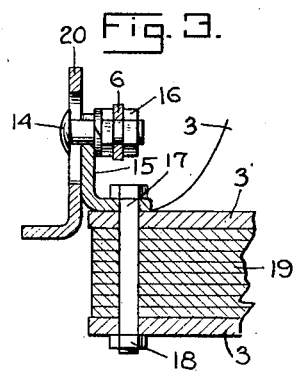
INVENTOR
Milton E. Wood

UNITED STATES PATENT OFFICE.

MILTON EDWARD WOOD, OF SOUTH AMBOY, NEW JERSEY.

MOTORCYCLE-SEAT.

1,353,108.   Specification of Letters Patent.   Patented Sept. 14, 1920.

Application filed August 23, 1919. Serial No. 319,495.

*To all whom it may concern:*

Be it known that I, MILTON E. WOOD, a citizen of the United States, and resident of the city of South Amboy, county of Middlesex, and State of New Jersey, have invented a new and Improved Motorcycle-Seat, of which the following is a full, clear, and exact description.

This invention relates to an improved suspension for seats, and more particularly to a suspension for a tandem seat for a motor cycle.

One of the objects of this invention is to provide a tandem seat construction, particularly adapted for motor cycles, which is of simple and rugged construction, but yet providing a comfortable seat.

A further object is to provide a tandem seat suspension for motor cycles which may be readily applied to a single seated motor cycle as an attachment.

Still a further object of this invention is to provide a tandem seat suspension means employing an elliptical spring support as a means for resiliently supporting the seat.

Still a further object of this invention is to provide a tandem seat suspension embodying a self contained construction in which a foot rest is provided, and employing an elliptical spring as the resilient means, and a means for readily adjusting the distance between the seat and the foot rest to accommodate the user thereof.

A further object of this invention is to provide in a motor cycle, a tandem seat construction having a foot rest associated therewith, and a resilient support, comprising support, including an elliptical spring, so arranged and constructed, that the distance between the seat and the foot rest is constant irrespective of the movement of the spring member.

The above objects are accomplished by providing a pivoted member extending rearwardly of the usual seat, over the rear wheel, and having means for supporting any suitable seat thereon. As a means of providing an effective, comfortable and durable spring support, an elliptical spring is preferably provided, having one side thereof connected with the frame or the axle of the motor cycle, and the other side connected with the pivoted member, preferably through an adjustable means. A foot rest is suitably supported by a member extending downwardly from the last named end of the spring, and moves in unison with the pivoted and resilient supporting structure for the rear tandem seat.

Other objects and advantages will be apparent from the following description and accompanying drawings showing a practical embodiment of the invention.

Similar characters of reference designate like parts in several views.

Figure 1 is a broken fragmentary view of a motor cycle showing, in elevation, the application of the tandem seat suspension means thereto.

Fig. 2 is an end fragmentary view partly in section and partly in elevation.

Fig. 3 is a sectional view looking in the direction of the arrows and taken on the line 3—3 of Fig. 1, showing certain details of construction.

A practical embodiment of the invention applied to a motor cycle, is shown in the drawings. As a means of supporting a suitable tandem seat 1, to the rear of the usual seat 2 carried in any suitable manner on the frame 3 of the motor cycle, a pivoted member 4 extends rearwardly of the front seat 2, and extends over the rear wheel 5. In the construction shown the front ends 6 of the member 4 are pivotally supported on the main part of the motor cycle, the side members of the side bars 7 of the U shaped member or supporting frame 4 being bent upward to clear the wheel guard 8, the rear end of said side bars being connected by the strip 9. It is to be understood however that the rearwardly extending bar for supporting the seat may be made of any suitable material, and be formed in any suitable shape, found most convenient for the particular machine to which the seat is to be attached. The tandem seat shown in Fig. 1, is provided with a suitable back 10, the front portion of the seat is pivotally carried at the upper end of a link 11 secured to the bars 7. A handle 12 is provided at the front part of the seat 1. Any suitable resilient support 13 may be interposed between the U-shaped member 4, and the rear end of the seat 1.

In the form shown, the front end 6 of each side bar is provided with an aperture through which extends a bolt 14, which bolt also passes through an aperture in a lug 15 rigid with the main frame of the machine 3. A nut 16 threaded on the bolt 14 or other suitable means may be provided for securely holding the front end 6 of the member in position.

In Fig. 3, the lug 15 is shown rigidly secured to the main frame structure 3 of the machine. For this purpose any suitable means may be provided for making such a connection, such as a bolt 17 and nut connection 18. The bolt 17 is shown passing through the lug 15, a webbed portion of the frame 3, and a main supporting spring 19. The angle member 20 is a portion of the adjustable support for the usual seat 2. It is understood that any suitable means may be provided for supporting the forward end of the rearwardly extending member.

As a means of providing a resilient support for the rearwardly extending member, a spring 21 preferably elliptical in form is interposed between the axle 22 of the rear wheel 5, and the tandem seat. One of the means for positioning the spring 21, is to provide an angular shaped bracket 23 having an aperture mounted on the rear axle 22 outside of the main supporting frame 24, the bracket 23, being securely held in position on the axle 22 by a nut 25 or other suitable means. One side of the elliptical spring 21, is connected to the bracket 23 by a bolt 26 or other suitable means. It is understood however, that one side of the spring members may be secured in any suitable manner. As a means of establishing a connection between the other side of the spring 21, and the rearwardly extending member carrying the tandem seat, a vertically extending member 27 preferably adjustable is interposed between the rearwardly extending member 4, and the spring 21. The upper end of said member is preferably pivotally connected to the side bars 7 by a bolt and nut connection 28. The connection between the spring 21 and the seat is made adjustable, by providing overlapping ends 29 and 30, and having openings 31 suitably spaced in one of said ends, the said ends being securely held in position by a bolt and nut connection 32. In the form shown in Fig. 2, the upper end of the member 27 is bent to bring the lower end thereof in alinement with the spring 21. It is to be understood however, that spring 21, and the rearwardly extending member 4 may be of any convenient form, and any suitable adjusting means provided therefor. For the convenience of the occupant of the tandem seat, a suitable foot rest 33 is provided, and so arranged that the foot rest moves in unison with the seat, thus maintaining a constant distance between the seat and the foot rest when adjusted to any particular position. As a means of carrying the foot rest 33, a downwardly exending bar 34 is preferably formed as a continuation of the member 27. The upper end of the bar is provided with a right angle bend 35 which rests upon the upper side of the spring 21, and is there held by a bolt and nut connection 36 or other suitable means. It is apparent that the distance between the seat and the foot rest may be adjusted by shifting the position of the bolt 32 in the openings 31.

While there has been shown herein but one preferred form of the invention, it is understood that various changes and applications may be made without departing from the spirit and scope of this invention.

Claims:

1. A device of the character described, comprising a member having one end thereof pivotally carried on a motor cycle, a seat supporting means arranged at the other end thereof, and means for yieldingly supporting said first named member, said means including an elliptical spring and a member fixed to the spring, a foot rest fixed to said last named member, and means for adjusting the distance between the said foot rest and seat.

2. A device of the character described, comprising a member having one end thereof pivotally carried on a motor cycle, a seat supporting means carried at the other end thereof, and means for yieldingly supporting said first named member, said means including an elliptical spring, and means having pivotal connections with said member, adapted to be supported on the axle of a motor cycle and a foot rest movable with the seat supporting means.

3. A tandem seat for a motor cycle comprising a V shaped member having one of its ends pivotally connected to the motor cycle, a seat carried by said member, a resilient support for said member, a foot rest carried by said resilient support, and means between the resilient support and said member, for adjusting the distance between the seat and the foot rest.

4. A tandem seat for a motor cycle comprising, a pivoted member extending rearwardly of the motor cycle, a seat suitably carried by said member and means for resiliently supporting said member including an elliptical spring and means having one end fixed to the spring, its opposite end being pivotally connected to such rearwardly extending member.

5. A tandem seat for a motor cycle comprising, a pivoted member extending rearwardly of the motor cycle, a seat resiliently supported by said member, an elliptical spring, a means for connecting one side of said spring rigid with the motor cycle frame, means rigid with the other side of the spring, including a member extending upwardly, and having a pivotal connection with said first mentioned pivoted member, and a downwardly extending member supporting a foot rest.

6. In a tandem seat attachment for a motor cycle comprising a pivoted member extending rearwardly over the wheel of the motor cycle, and a seat carried thereby, an elliptical spring supported on the axle of the wheel, for resiliently supporting the said rearwardly extending pivoted member, and means connected between the elliptical spring and the pivoted member for adjusting the distance therebetween.

7. A tandem seat attachment for a motor cycle, comprising a rearwardly extending member, a seat suitably supported thereon, an elliptical spring supported on the axle of the rear wheel, an adjustable means connecting the upper leaf of the elliptical spring, and the rearwardly extending member, and a foot rest supported by a member extending downwardly from the upper leaf spring.

MILTON EDWARD WOOD.